Jan. 27. 1925.
S. J. McVEY ET AL
1,524,443
VEHICLE HEADLIGHT
Filed March 21, 1924
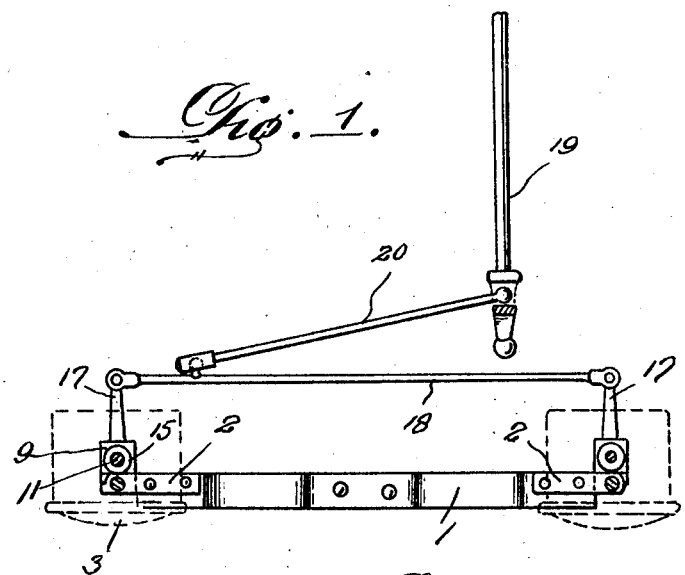
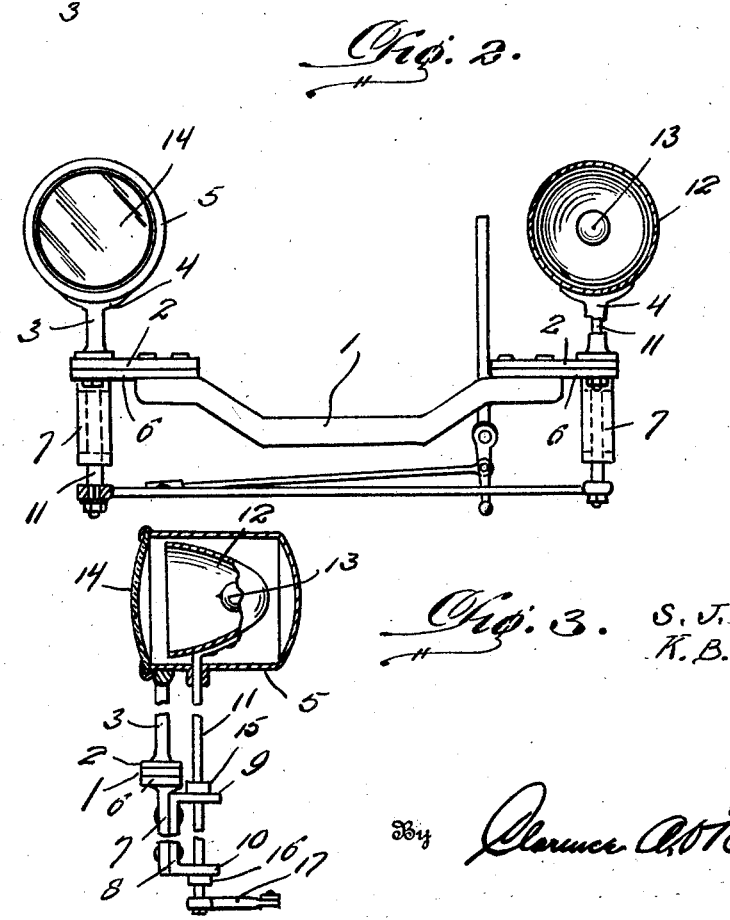
S. J. McVey,
K. B. Eaton,
Inventor
By Clarence A. O'Brien
Attorney Patented Jan. 27, 1925.

1,524,443

UNITED STATES PATENT OFFICE.

SAMUEL J. McVEY AND KENNETH B. EATON, OF BELLEVILLE, WEST VIRGINIA.

VEHICLE HEADLIGHT.

Application filed March 21, 1924. Serial No. 700,886.

*To all whom it may concern:*

Be it known that we, SAMUEL J. MCVEY and KENNETH B. EATON, citizens of the United States, residing at Belleville, in the county of Wood and State of West Virginia, have invented certain new and useful Improvements in a Vehicle Headlight, of which the following is a specification.

This invention relates to new and useful improvements in a vehicle headlight construction and has for its principal object to provide a device wherein the lights will automatically turn with the turning of the front wheels of a vehicle so that the rays of light are thrown in front of the vehicle at all times, when going around corners or curves as well as when going straight ahead.

A further object of the invention is to provide a headlight construction of the above mentioned character, which is adapted to be actuated by the steering rod of the vehicle, the construction of the device being such as to provide the easy and efficient operation of the turning of the lights simultaneously with the turning of the front wheels.

Another important object of the invention is to provide a headlight construction of the above mentioned character, wherein the lamp casing is rigidly supported on the front of the vehicle, and the reflector and lamp mounted therein are adapted to rotate therein when the front wheels of the vehicle are turned.

A still further object of the invention is to provide a device of the above-mentioned character, which is simple in construction, inexpensive, strong and durable and furthermore adapted for the purposes for which it is designated.

Other objects and advantages of this invention will become apparent during the course of the following description.

In the accompanying drawings forming a part of this specification, and in which like numerals designate like parts throughout the same, Figure 1 is a top plan view of my device showing the same attached to the radiator supporting beam of an automobile, Figure 2 is a front elevation of the device with parts in section, and Figure 3 is a side elevation with parts in section.

In the drawing wherein for the purpose of illustration is shown the preferred embodiment of our invention, the numeral 1 designates the usual cross beam which extends transversely across the forward end of the chassis frame in the well known manner and it is not thought any further detail description of the same is necessary for the purposes of carrying out the objects of the present invention. Extending outwardly from the respective ends of the cross beam 1 and secured thereto in any suitable manner are the supporting brackets 2. The outer ends of the supporting brackets are provided with the upstanding portions or standards 3 and the uppermost ends of the upstanding portions 3 are provided with the extensions 4 for supporting thereon and holding the same in a rigid position the headlight casings 5.

Similar brackets 6 are also supported on the outer ends of the cross beam 1 and the outed ends of the brackets 6 are provided with the depending portions 7 in the manners clearly shown in Figures 2 and 3 of the drawing. The depending portions 7 provide a means for supporting thereon auxiliary U-shaped brackets 8 the same being secured to the depending portions 7 in any suitable manner and preferably arranged so as to extend rearwardly.

The auxiliary brackets 8 are provided with laterally disposed portions 9 and 10 respectively, and the same are provided with registering apertures or openings through which extend the vertical shafts 11. The upper ends of the shafts 11 extend through suitable openings provided in the bottom of the casings 5 and are adapted to support thereon the reflector 12 in the manners clearly shown in Figure 3 of the drawing. The reflector 12 furthermore supports the lamp 13 and the reflector and lamp are adapted for rotary movement within the casing 5 in the manner hereinafter more fully described. As is also shown in Figure 3 of the drawing, the front of the casing 5 is provided with the lens 14.

The lower ends of the shafts 11 extend through the lateral extensions 9 and 10 provided on the bracket 8 and for the purpose of preventing the vertical movement of the shaft in the brackets 8 we provide the collars 15 and 16 respectively. The collar 15 preventing the downward movement of the shaft of each of the shafts while collar 16 limits the upward movement of each of the shafts. The lowermost portions of the shafts have the links 17 secured at one of their ends thereto, the links extend rearwardly and have their rear ends connected to the transversely extending rod 18 whereby the shafts 11 will be connected together and will be adapted to be operated simultaneously in the manner to be presently described. The transversely extending rod 18 is further connected to the steering rod 19 of the vehicle by means of a connecting rod 20. Any suitable connection may be provided at the ends of the connection rod 20 for connecting the same to the transverse rod and steering rod 19 respectively and we do not wish to limit ourselves to the particular manner in which the same is secured.

The operation of our device may be briefly stated as follows: Normally the reflectors and lamps mounted in the casing are in line with the front wheel of the vehicle when the vehicle is pursuing a straight course. When the vehicle turns a corner or a curve in the road, the simultaneously turning of the wheels will cause a simultaneous rotation of the shafts 11 and the reflectors and lamps 13 carried by the upper ends thereof so that the rays of light from the lamps 13 will be directed in front of the vehicle in line with the wheels, thus illuminating the road directly in front of the vehicle regardless of the position of the front wheels thereof.

While we have shown and described a headlight construction wherein the reflectors and lamps associated therewith are adapted to rotate in stationary casings, the reverse construction may also be made wherein the reflectors may be stationary and the casings adapted to rotate.

A headlight construction of the above mentioned character, will not only be simple in construction but will be strong and durable and will not in any way interfere with the operation of the steering gear of the vehicle.

While we have shown the preferred embodiments of our invention, it is to be understood that various changes in the size, shape and arrangement of parts may be resorted to without departing from the spirit of the invention and the scope of the appended claim.

Having thus described our invention, what we claim is:—

In a vehicle headlight structure of the class described, an attaching bracket adapted to be mounted upon one end of the front cross bar of the vehicle chassis frame, said bracket to extend beyond said bar, the extended portion being equipped with a depending portion, a substantially U-shaped bearing member attached to the rear side of said depending portion, the arms of said member being provided with vertically aligned guide openings, a standard rising vertically from said bracket, a headlight casing rigidly mounted upon the upper end of said standard, said casing being provided in its bottom with an opening in alignment with the aforesaid guide openings, a light reflector disposed for movement in said casing, a shaft extending rotatably through said casing opening and guide opening in said bearing member, said shaft being secured at its upper end to said reflector, stop collars attached to said shaft at points for rotatably contacting the arms of said U-shaped member, and a lateral crank arm connected to the lower end of said rotary shaft.

In testimony whereof we affix our signatures.

SAMUEL J. McVEY.
KENNETH B. EATON.